J. D. HISS.
GRANULATING MACHINE.
APPLICATION FILED MAR. 25, 1907.
920,869.
Patented May 4, 1909.
3 SHEETS—SHEET 1.
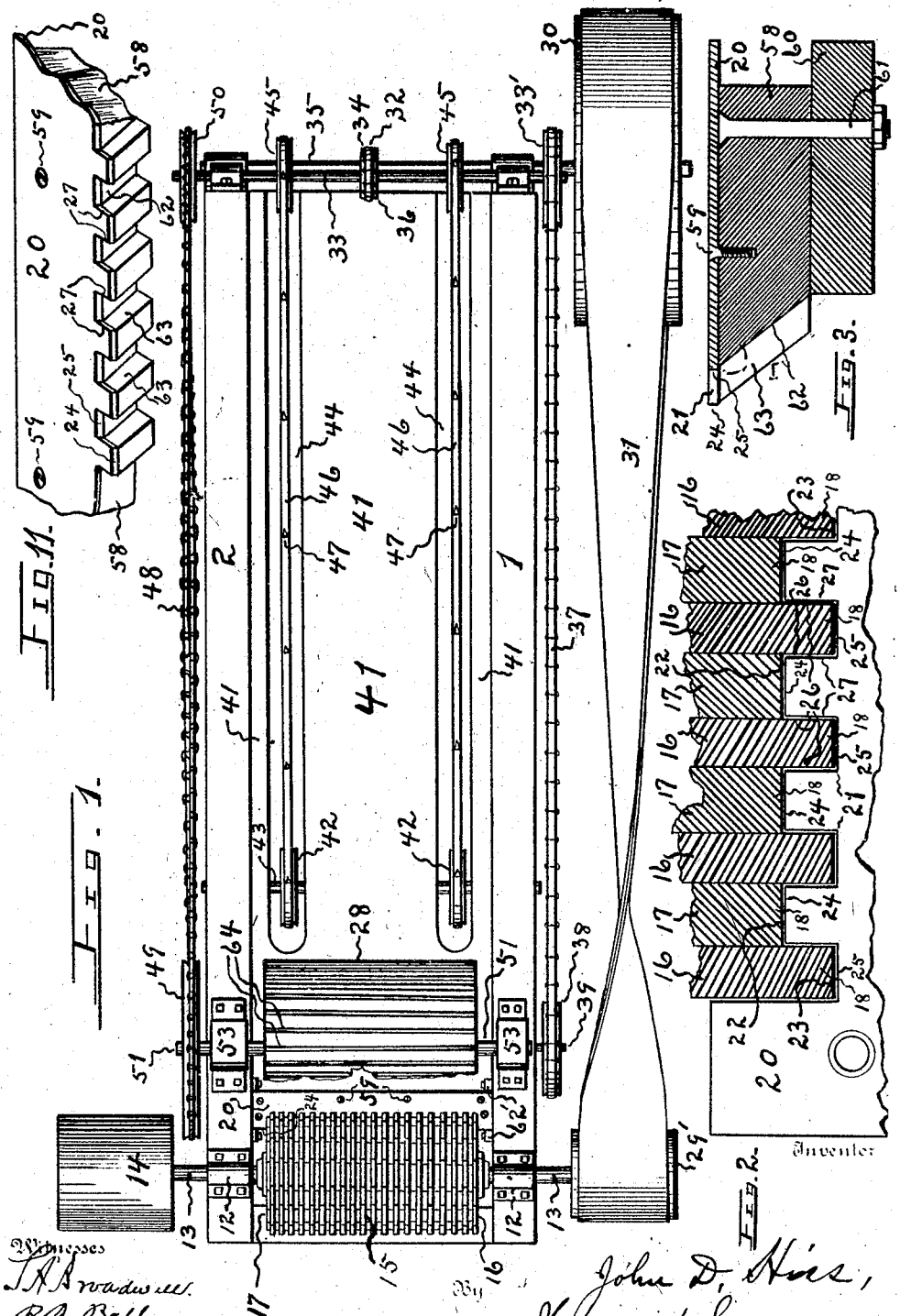

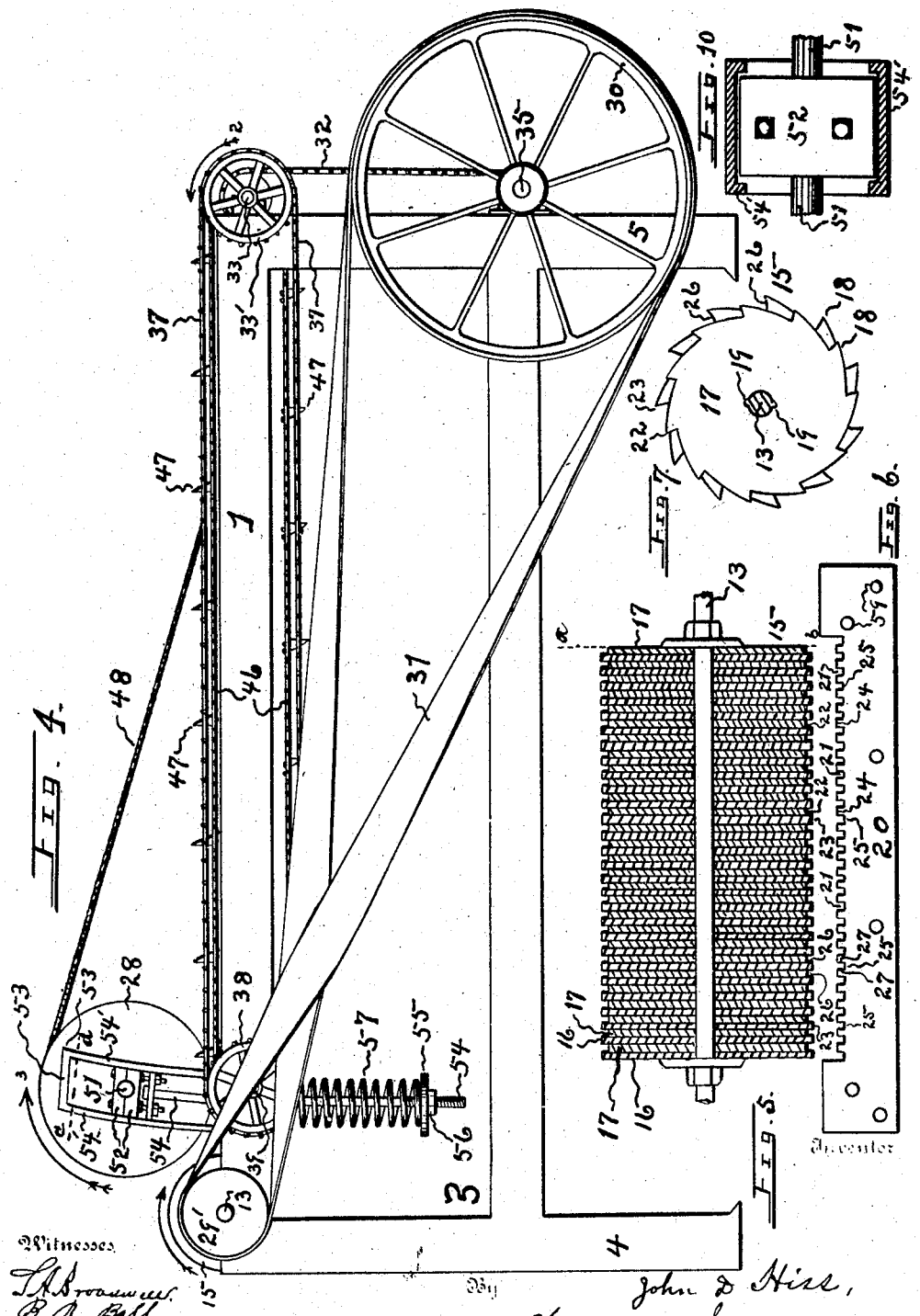

J. D. HISS.
GRANULATING MACHINE.
APPLICATION FILED MAR. 25, 1907.
920,869.
Patented May 4, 1909.
3 SHEETS—SHEET 3.
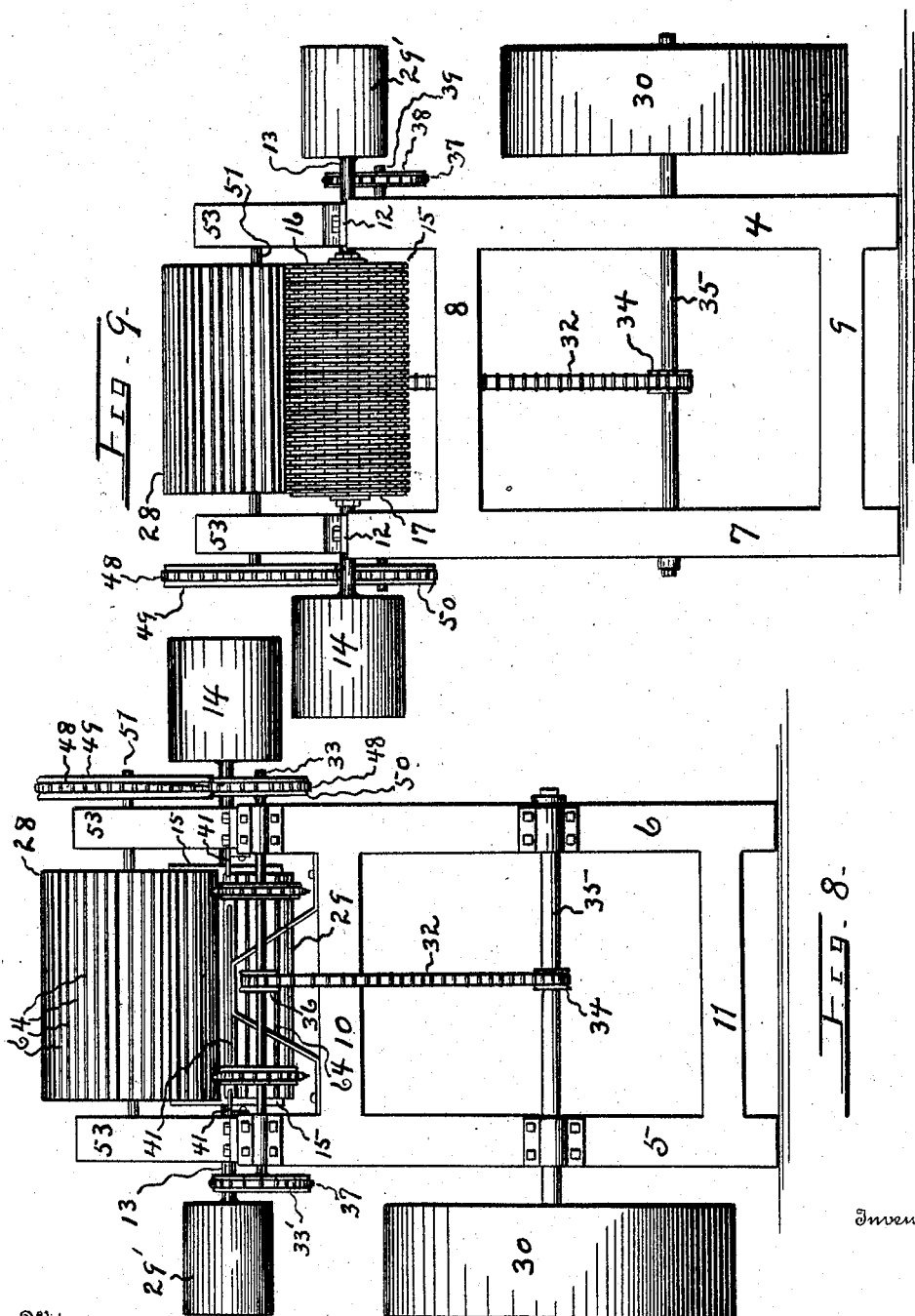

UNITED STATES PATENT OFFICE.

JOHN D. HISS, OF OMAHA, NEBRASKA.

GRANULATING-MACHINE.

No. 920,869.   Specification of Letters Patent.   Patented May 4, 1909.

Application filed March 25, 1907. Serial No. 364,263.

*To all whom it may concern:*

Be it known that I, JOHN D. HISS, a citizen of the United States, residing at Omaha, in the county of Douglas and State of Nebraska, has invented certain new and useful Improvements in Granulating-Machines, of which the following is a specification.

This invention relates to improvements in granulating machines, and has for its object, primarily, the presentation of a means for cutting the stems of alfalfa into small granules for the product known as alfalfa meal, and includes mechanism for passing a compact mass of alfalfa forage or similar material over a recessed plate where it is cut into short lengths suitable for the meal, by a rotatable toothed cylinder.

The invention refers to a cylinder having thereon a series of teeth disposed at different radial distances; and to a stationary plate having recesses within which the teeth travel, this being for the purpose of furnishing reliable means for thoroughly cutting the stems.

The invention also refers to the form of the recesses in the plate, to be considered in connection with the form and movement of the teeth of the cylinder.

In machines heretofore presented for the above purpose it has been necessary, in order to effect granulation, to pass the material more than once through such machines, for the reason that, since the stems are never presented parallel, a large proportion of the material does not make contact with the cutting surfaces which are provided, especially is this the case where the material is moist or damp; the result, therefore, in the use of such machines is to tear the stems into shreds, but a considerable portion of the stems pass the machine for the reason first stated. In the present construction it is intended that all stems will be cut into short lengths without reference to the angle presented by such stems when entering the cutting devices.

The invention also has reference to certain features of economical construction as a complete machine, and to features found of advantage in assembling the parts, all of which is fully explained hereinafter. The machine has few and simple parts and may be manufactured at small expense, comparatively speaking. The invention consists of the combination and arrangement of parts as described herein, pointed out by the claims and illustrated in the drawings, wherein —

Figure 1 represents a plan view of the invention, a part of the resiliently-mounted roller being broken away to disclose other parts. Fig. 2 is an enlarged, broken, plan view, to show relative positions of the recessed plate and cylinder teeth, the latter being in section. Fig. 3 is a vertical presentation of the recessed plate and its supporting-plates in transverse section. Fig. 4 is a vertical side elevation of the machine. Fig. 5 is a plan view of the cutting cylinder in longitudinal section. Fig. 6 is a plan view of the recessed plate. Fig. 7 is an end view of the cutting cylinder as on line $a\,b$ of Fig. 5, the shaft being in section. Figs. 8 and 9 are, respectively, rear and front views of the machine. Fig. 10 is a plan view, somewhat enlarged, of guides 53, being a view thereof on line $c\,d$ of Fig. 4. Fig. 11 is a perspective view, broken away, of the recessed cutting-plate mounted upon the bed-plate.

Referring now to the several figures in the drawings, the numerals 1 and 2 indicate side-pieces for the upper part of a frame 3, and legs 4, 5, 6 and 7 provide a suitable support therefor, the front legs being connected by cross-pieces 8 and 9, and the rear legs by cross-pieces 10 and 11.

At the front end of the frame upon side-pieces 1 and 2 in suitable bearings 12 (Figs. 1, 9.) is mounted shaft 13 upon one end of which is pulley 14 adapted to receive rotation from any convenient exterior power; and, midway on this shaft between side-pieces 1 and 2 is secured the cutting-cylinder 15 which rotates in the direction indicated by the arrow (Fig. 4.) to perform the cutting. This cylinder is preferably formed by use of vertically-disposed, circular plates 16 and 17. Plates 16 have a greater diameter than plates 17; each of said plates are provided with teeth 18 at their outer extremity. Shaft 13 is provided with splines 19 upon which plates 16 and 17 are alternately seated, and they will be held non-rotatively and secured so that the teeth of one plate will be presented in alternation, horizontally considered, with the teeth of an adjoining plate.

I employ the horizontally-disposed, recessed plate 20 (Figs. 1, 2, 3, 6.) which extends between side-pieces 1 and 2, and in order that this plate may have a secure mounting it is seated upon bed-plate 58 and held by means of screws 59; bed-plate 58 is preferably secured upon supporting-plate 60 as by means of bolts 61, and as arranged, plates 58 and 60 extend the entire length of and beneath recessed plate 20; supporting-plate 60 is sustained by brackets 62' (Fig. 1.) secured upon the inner faces of sides 1 and 2. This construction affords a secure mounting for the recessed plate. This plate is comparatively thin and should be of a fine quality of steel. Since the recesses or cutting-walls thereof become worn during the action of cutting forage, it is arranged so that it may be reversed, and when turned bottom upward may be used until the opposite cutting-walls are worn; as a measure of economy, therefore, plate 20 is of light structure and plates 58 and 60 which are of heavier construction are depended upon to prevent vibration during the cutting of the alfalfa, the latter plates being permanently mounted, while plate 20 may be readily removed or reversed when desired, screws 59 being used as a holding means therefor.

Bed-plate 58 has a front wall 62 formed downwardly converged with a series of outwardly-extending projections or ridges formed thereon and angular in form, indicated at 63, and recesses are formed between ridges 63 which correspond to recesses 21 in plate 20; this particular construction permits ample space for the passage of the product in a downward direction after its cutting has been effected, and furnishes a substantial support, found necessary for that part of plate 20 which is located between recesses 21 thereof.

The recessed plate is disposed adjacent to and, horizontally considered, centrally of cylinder 15; this plate is provided with a series of angularly formed recesses 21 upon its inner edge, each recess having a depth equal to the difference in the radii of plates 16 and 17, and a width corresponding to the thickness of said plates 16 and 17. Recesses 21 are angularly formed and are adapted to receive therein the teeth of plates 16, and all material cut by the machine passes through these recesses or adjacent to the inner wall 24 of plate 20. The cutting of the stalks, leaves or stems is performed by action of the teeth of the cylinder-plates passing within the recesses or adjacent to the inner wall of plate 20 and, as will be seen, the action is certain; since the teeth-edges 22 and 23, respectively, of plates 17 and 16 (Fig. 2.) are disposed parallel with and pass closely adjacent to the inner wall or edge 24 of plate 20, and inner walls 25 of recesses 21, the action of cutting performed by these parts, is certain in operation; teeth 18 of plates 16 have edges 26 which pass parallel with and closely adjacent to the transverse walls 27 of recesses 21, the degree of adjacency of these parts being sufficient to cause a cutting of all portions, including the finer parts of alfalfa. It will be appreciated by those conversant with the manufacture of alfalfa meal, that the means just described is highly effective, and that the results desired are effected without a second passage of the product through the machine. Stems presented parallel with the cylinder, of course, will be cut into lengths corresponding to the spaces between parallel walls 26 of recesses 21; stems of forage presented at right angles to the cylinder will be cut of a length equal to the length of teeth 18; if there is a diagonal presentation of stems, a cutting is nevertheless certain although the length of the granules will be slightly greater than where the presentation is transverse or parallel with the cylinder.

The invention has reference to a means for compressing the material and for holding the same during the operation of cutting, as a compact mass, for, as is apparent, if loose material is thrown upon or passes loosely upon the rotating cylinder the stalks, or many of them would be bent and "doubled" upon themselves in a manner to pass the recesses of plate 20 without being cut; therefore, in order that the material may pass as a compact mass to the cylinder, devices are employed so that it is directed between rollers 28 and 29 from the rear of the machine, roller 28 being resiliently mounted in a manner to depress the material upon roller 29; both of these rollers are corrugated longitudinally as shown at 64 and the material is compressed and forced in a forward direction to an engagement with the teeth of cylinder 15, the mass resting upon recessed plate 20 at the time of such engagement.

As a convenient means for actuating rollers 28 and 29, I employ pulley 29' upon the end of shaft 13; this pulley is connected with a balance wheel 30, preferably by means of belt 31. This balance wheel is suitably mounted upon shaft 35 upon suitable bearings at the rear of the machine, and, by any convenient means, as by sprocket chain 32, a rotation is communicated to shaft 33 since chain 32 has a connection with gear 34 upon shaft 35 of the balance wheel and with gear 36 of shaft 33. Shaft 33 and gear 33' have a rotation indicated by arrow 2, and by means of chain 37 idler gear 38 has a similar rotation. Gear 38 has a shaft 39 (Figs. 1, 4.) upon which is mounted roller 29 which rotates in a manner to pass the material in a forward direction. This roller is non-resilient in its mounting and its periphery is, at its upper extremity, on a level with the recessed plate 20.

The machine is provided with a floor 41

(Fig. 1.) occupying substantially the same plane as plate 20, and is useful simply to sustain the material while it is passed from the rear of the machine to rollers 28 and 29; idler gears 42 are mounted upon shaft 43 (Fig. 1.), the latter being mounted in side-pieces 1 and 2 adjacent to and at the rear of rollers 28 and 29; upon shaft 33 at the rear of the machine are mounted gears 45, which, with gears 42 occupy a part of slots 44, these slots being formed in the floor 41. I preferably employ sprocket chains having outwardly-extending fingers 47, and the devices mentioned afford simple and effective means for conveying material from the rear toward the front of the machine, and for communicating rotation to roller 29.

Roller 28 receives rotation in the direction indicated by arrow 3 (Fig. 1.) by reason of chain 48 frictionally seated upon pulleys 49 and 50, best shown in Fig. 8, pulley 50 being mounted upon shaft 33 already described; pulley 49 has a mounting upon shaft 51, and when the machine is in operation, material to be cut is manually placed upon floor 41 at the rear of the machine, and under operation of devices named is moved forward and passed between rollers 28 and 29 where it is pressed into a compact mass, and by operation of these rollers is forced forwardly and is cut by means of the teeth which either travel within the recesses of or adjacent the inner or cutting edge 24 of plate 20, already described.

In order that roller 28 may have a resilient mounting, shaft 51 has a seating between bearing-heads 52, the latter being slidably seated within guides 53. Guides 53 are preferably secured upon side-pieces 1 and 2 and have oppositely-disposed end-walls 54' curved to conform to an arc whose center is shaft 33. I employ sustaining-bolts 54 each having an upper end connected with bearing-heads 52 and a lower end extended below side-pieces 1 and 2 and terminating in a threaded end-part, and upon the latter is employed the washer or collar 55 and nut 56; spiral springs 57 are seated upon that part of sustaining-bolts 54 between collars 55 and side-pieces 1 and 2, and it will be understood that shaft 51 may have a limited upward swing subject to the resistance of springs 57; and the resiliency of the springs may be adjusted in a well known manner by means of the threaded connection of nuts 56 with sustaining bolts 54. These springs, combined with the weight of roller 28 cause the material to be pressed into a mass between the rollers, considered sufficiently solid to be cut to advantage by the particular cutting devices described; the degree of solidity of the mass depends in a large measure upon the presence of dampness in the material, and if material is quite dry or crisp, the resiliency should be adjusted to a greater degree. By reason of the resilient mounting of roller 28, the parts are less liable to become broken, since the material might be supplied irregularly.

The diameters of pulleys 49 and 50 should be of suitable relative extent, so that the movement of roller 28 at its circumference will equal that of roller 29, to the end that material may pass properly between these rollers.

Having described operation and function quite fully while enumerating the parts, it is believed that any further or particular description is not required.

I have described exact details, the same being considered the best construction, but I do not limit myself to such exactness, and it is believed that certain minor details could be changed without departing from the invention, the status of the latter being determined by its claims.

What I claim as my invention is,—

1. A granulating machine, in combination; a frame; a horizontally disposed, recessed, reversible cutting-plate; a knife roll having teeth traversing the recesses of the horizontally disposed, reversible cutting-plate; a lower feed roll mounted upon the frame; curved guides mounted and extended upwardly from the frame, each of said curved guides having a slidable bearing-head seated therein; an upper feed roll having its shaft mounted within the slidable bearing-heads of the curved guides and having a periphery disposed adjacent the periphery of the lower feed roll substantially upon the plane of the horizontally disposed, recessed, reversible cutting-plate.

2. A granulating machine, in combination; a frame; an actuating pulley mounted upon the frame; a horizontally disposed, recessed cutting-plate; a knife roll having teeth traversing the recesses of the horizontally disposed cutting-plate; a lower feed roll; curved guides mounted and extended upwardly from the frame, each of said curved guides having a resiliently mounted bearing-head seated therein; an upper feed roll having its shaft disposed within the resiliently mounted bearing heads of the curved guides; a roll-pulley mounted upon the shaft of said upper feed roll; a flexible member between said actuating pulley and said roll-pulley; said upper feed roll having its periphery disposed adjacent the periphery of the lower feed roll substantially upon the plane of the horizontally disposed, recessed cutting-plate.

In testimony whereof I have affixed my signature in presence of two witnesses.

JOHN D. HISS.

Witnesses:
 HIRAM A. STURGES,
 CHAS. H. DAVIS.